(12) United States Patent
Petride et al.

(10) Patent No.: US 11,379,476 B2
(45) Date of Patent: Jul. 5, 2022

(54) BITMAP-BASED COUNT DISTINCT QUERY REWRITE IN A RELATIONAL SQL ALGEBRA

(71) Applicant: Oracle International Corporation, Redwood Shores, CA (US)

(72) Inventors: Sabina Petride, Tracy, CA (US); Mohamed Ziauddin, Pleasanton, CA (US); Praveen T. J. Kumar, Nashua, NH (US); Huagang Li, San Jose, CA (US); Andrew Witkowski, Foster City, CA (US); Sankar Subramanian, Cupertino, CA (US)

(73) Assignee: Oracle International Corporation, Redwood City, CA (US)

( * ) Notice: Subject to any disclaimer, the term of this patent is extended or adjusted under 35 U.S.C. 154(b) by 178 days.

(21) Appl. No.: 16/653,639

(22) Filed: Oct. 15, 2019

(65) Prior Publication Data
US 2021/0109930 A1    Apr. 15, 2021

(51) Int. Cl.
*G06F 16/00* (2019.01)
*G06F 16/2453* (2019.01)
*G06F 16/22* (2019.01)
*G06F 16/23* (2019.01)
*G06F 16/242* (2019.01)

(52) U.S. Cl.
CPC .... *G06F 16/24539* (2019.01); *G06F 16/2282* (2019.01); *G06F 16/2393* (2019.01); *G06F 16/244* (2019.01); *G06F 16/2454* (2019.01)

(58) Field of Classification Search
CPC .......... G06F 16/24539; G06F 16/2454; G06F 16/2282; G06F 16/244; G06F 16/2393

USPC .......................................................... 707/717
See application file for complete search history.

(56) References Cited

U.S. PATENT DOCUMENTS 10,503,737 B1 * 12/2019 Manville ............ G06F 16/2455
2002/0095421 A1    7/2002 Koskas
(Continued)

OTHER PUBLICATIONS

Developing a Dynamic Materialized View Index for Efficiently Discovering Usable Views for Progressive Queries, Zhu et al., (Year: 2013).*

(Continued)

*Primary Examiner* — Jean M Corrielus
(74) *Attorney, Agent, or Firm* — Hickman Becker Bingham Ledesma LLP

(57) ABSTRACT

Techniques are described for storing and maintaining, in a materialized view, bitmap data that represents a bitmap of each possible distinct value of an expression and rewriting a query for a count of distinct values of the expression using the materialized view. The materialized view contains bitmap data that represents a bitmap of each possible distinct value of a first expression, and aggregate values of additional expressions, and is stored in memory or on disk by a database system. The database system receives a query that requests a number of distinct values, of the first expression, and an aggregate value for an additional expression. In response, the database system, rewrites the query to: compute the number of distinct values by counting the bits in the bitmap data of the materialized view that are set to the first value, and obtains the aggregate value for the additional expression in the materialized view.

28 Claims, 4 Drawing Sheets

(56) References Cited

U.S. PATENT DOCUMENTS

| | | | |
|---|---|---|---|
| 2006/0085592 A1* | 4/2006 | Ganguly | G06F 16/2456 711/114 |
| 2009/0244633 A1 | 10/2009 | Johnston | |
| 2009/0327255 A1 | 12/2009 | Larson | |
| 2012/0323962 A1* | 12/2012 | He | G06F 16/24556 707/769 |
| 2013/0166557 A1* | 6/2013 | Fricke | G06F 16/3331 707/737 |
| 2015/0070397 A1 | 3/2015 | Miller | |
| 2017/0024387 A1 | 1/2017 | Su | |
| 2018/0121504 A1* | 5/2018 | Bienert | G06F 16/24537 |
| 2019/0130040 A1 | 5/2019 | Ma | |
| 2019/0197162 A1* | 6/2019 | Chiang | G06F 16/24542 |
| 2019/0303479 A1* | 10/2019 | Behm | G06F 16/2471 |
| 2021/0109930 A1 | 4/2021 | Petride | |
| 2021/0191941 A1 | 6/2021 | Petride | |

OTHER PUBLICATIONS

Petride, U.S. Appl. No. 16/726,597, filed Dec. 24, 2019, Office Action, dated May 5, 2021.
Petride, U.S. Appl. No. 16/726,597, filed Dec. 24, 2019, Final Rejection, dated Oct. 21, 2021.
'Database SQL Reference', DENSE_RANK, Oracle Help Center, Oracle Database Online, Oracle Database Online Documentation, 10g Release 2 (10.2), 2019, 3 pages.
'Database Data Warehousing Guide', 25 Using Parallel Execution, Oracle Help Center, Oracle Database Online Documentation, 10g Release 2 (10.2), Apr. 19, 2006, 51 pages.
Wu, Kesheng, et al., "Optimizing Bitmap Indices With Efficient Compression", ACM Trans. on Databse Sys, vol. V, No. N, Jul. 2005, 36 pages.
Wu, Kesheng, et al., "Compressing bitmap indexes for faster search operations", Comp. Science, Proceedings 14th Intl Conf. on Scientific and Statistical Database mgmt, published 2002, 10 pages.
Wang, Jianguo, et al., "An Experimental Study of Bitmap Compression vs. Inverted List Compression", DOI: http://dx.doi.org/10.1145/3035918.3064007, SIGMOD '17, May 14, 2017, 16 pages.
Randolf, E. G., "Oracle related stuff: Hash Aggregation", https://oracle-randolf.blogspot.com/2011/01/hash-aggregation.html, Jan. 16, 2011, 37 pages.
Mula, Wojciech, et al., "Faster Population Counts Using AVX2 Instructions", arXiv:1611.07612v9, Sep. 5, 2018, 10 pages.
Lemire, Daniel, et al., "Consistently faster and smaller compressed bitmaps with Roaring", Wiley online library, Software: Practice and Experience, vol. 46, Iss. 11, pp. 1547-1569, Nov. 2016, 24 pages.
Flajolet, Phillipe, et al., "HyperLogLog: the analysis of a near-optimal cardinality estimation algorithm", 2007 DMTCS Proceedings, Iss. 1, pp. 137-156, Analysis of Algorithms Conf. 2007, 18 pages.
Chen, Zhen, et al., "A Survey of Bitmap Index Compression Algorithms for Big Data", Tshinghua Science and Tech, Issn 1007-0214 11/11, pp. 100-115, vol. 20, No. 1, Feb. 2015, 16 pages.
Barzan Mozafari, "Approximate Query Engines: Commercial Challenges and Research Opportunities", SIGMOD 2017, 4 pages.
Antoshenkov, G. et al., "Byte-aligned bitmap compression", in Proceedings DCC '95 Data Compression Conf, vol. 1, p. 476, 1995, 1 page.
"Population Count—Chessprogramming Wiki," https://www.chessprogramming.org/Population_Count, accessed on Oct. 26, 2021, 16 pages.
"Other Builtins (Using the GNU Compiler Collection (GCC))", https://gcc.gnu.org/onlinedocs/gcc/Other-Builtins.html, accessed on Oct. 25, 2021, 16 pages.
"Learn Oracle COUNT( ) Function by Practical Examples", Oracle Tutorial, Oracle COUNT, https://www.oracletutorial.com/oracle-aggregate-functions/oracle-count/, Oct. 28, 2018, 7 pages.
"Hamming weight", Wikipedia, https://en.wikipedia.org/wiki/Hamming_weight, page last updated Oct. 19, 2021, 9 pages.
Petride, U.S. Appl. No. 16/726,597, filed Dec. 24, 2019, Notice of Allowance and Fees Due, dated Apr. 29, 2022.

* cited by examiner

BITMAP-BASED COUNT DISTINCT QUERY REWRITE IN A RELATIONAL SQL ALGEBRA

FIELD OF THE INVENTION

The present invention relates to processing queries in a multi-node database system. Specifically, the present invention relates to generating materialized views of expressions in order to track distinct expression values for expressions within queries and rewriting the queries to use the materialized views in order to determine distinct counts of expressions.

BACKGROUND

Structured query language (SQL) is a domain-specific language used in programming to manage data held in a relational database management system (RDBMS). SQL includes data query commands for accessing data records from the RDBMS. SQL includes several different types of functions for evaluating data records, such as a COUNT function that returns a number of records that have a value for an attribute. For example, if a query included the COUNT function as SELECT COUNT(Color) from TABLE1, then the COUNT function would return the number of records from TABLE1 that have any value for the Color attribute. Another SQL function is a COUNT DISTINCT function that counts the number of distinct values for an attribute. For example, assume that TABLE1 contains 10 records that have values for the Color attribute, and that those ten records have one of three color values (Red, Green, Blue). Under these circumstances, the query SELECT COUNT(Color) from TABLE1 would return the value 10 (because ten rows have color values), and the SELECT COUNT DISTINCT(Color) from TABLE1 would result in a COUNT DISTINCT value equal to 3, which represents the number of unique Color values from the 10 records in TABLE1.

Typically, the target of the COUNT DISTINCT expression is a set of tuples. The set of tuples may be values retrieved from database tables, or tuples created by performing operations on such values. Each value in a tuple corresponds to a different attribute. The target of the COUNT DISTINCT operation is referred to herein as the "target expression". The target expression may be a single attribute (e.g. Color), or a more complex expression (e.g. Firstname&"&MiddleName&"&Lastname). Within a tuple, the value that corresponds to the target expression is referred to herein as the "target expression value" for the tuple. For example, for the query SELECT COUNT DISTINCT (Color), the target expression is Color. The target expression value for a given row may be Red, Green, or Blue.

Conventional approaches for implementing a COUNT DISTINCT function on a set of tuples includes first sorting the set of tuples based on the target expression values for the tuples, and then removing tuples that have duplicate target expression values. For example, the 10 rows of TABLE1 may be sorted based on the color values, so that all rows with Blue are followed by all rows with Green, which are followed by all rows with Red. Elimination of duplicates would leave one row with Blue, one row with Green, and one row with Red.

By sorting the set of tuples by their target expression values, tuples with duplicate target expression values may be easily identified and then removed from the set of tuples. The number of target expression values in the remaining set of tuples would then represent a distinct count of the target expression values. However, this approach of first sorting and then removing duplicate target expression values may involve significant processing resources to sort the set of tuples based on their corresponding target expression values when the set of tuples represents a large set of data. As the size of the set of tuples increases, the processing resources required to sort and discard duplicate target expression values may increase dramatically.

Another such approach to implementing a COUNT DISTINCT function is by hashing the set of tuples according to the target expression values, and then removing duplicates within each hash partition. Implementing hashing may be less computationally intensive than the sorting approach and may scale better with a sufficiently large set of tuples. However, the hashing approach still involves consuming large amounts of processing resources in order to implement the hashing functionality on the set of tuples.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To avoid the overhead caused by either sorting a set of tuples based on target expression values or hashing the set of tuples based on the target expression values, techniques are presented herein for:

storing and maintaining, in a materialized view, bitmap data that represents a bitmap that contains a bit for each possible distinct value of the target expression, and rewriting COUNT DISTINCT queries to obtain the COUNT DISTINCT of the target expression using information from the materialized view.

In an embodiment, the materialized view contains both:
bitmap data that represents for one or more bitmaps that have a bit for each possible distinct value of a target expression, and
one or more aggregate values of additional expressions, other than the target expression.

The DBMS maintains the bitmap data such that bits that correspond to values of the target expression that exist in a particular set of data are set to a first value. For example, bits corresponding to existing values of the target expression of the particular set of data are set to 1 (first value). Bits that correspond to values of the target expression that do not exist in the particular set of data are set to a second value, such as 0.

In an embodiment, the DBMS may receive a query that requests both:
a count of distinct values, of the target expression, for the particular set of data, and
an aggregate value for a particular additional expression.

In response to receiving the query, the DBMS may rewrite the query to cause execution of the query to: compute the number of distinct values by counting the bits in the bitmap data of the materialized view that are set to the first value, and obtain the aggregate value for the particular additional expression based on the one or more aggregate values in the materialized view.

System Overview

Figure 1:
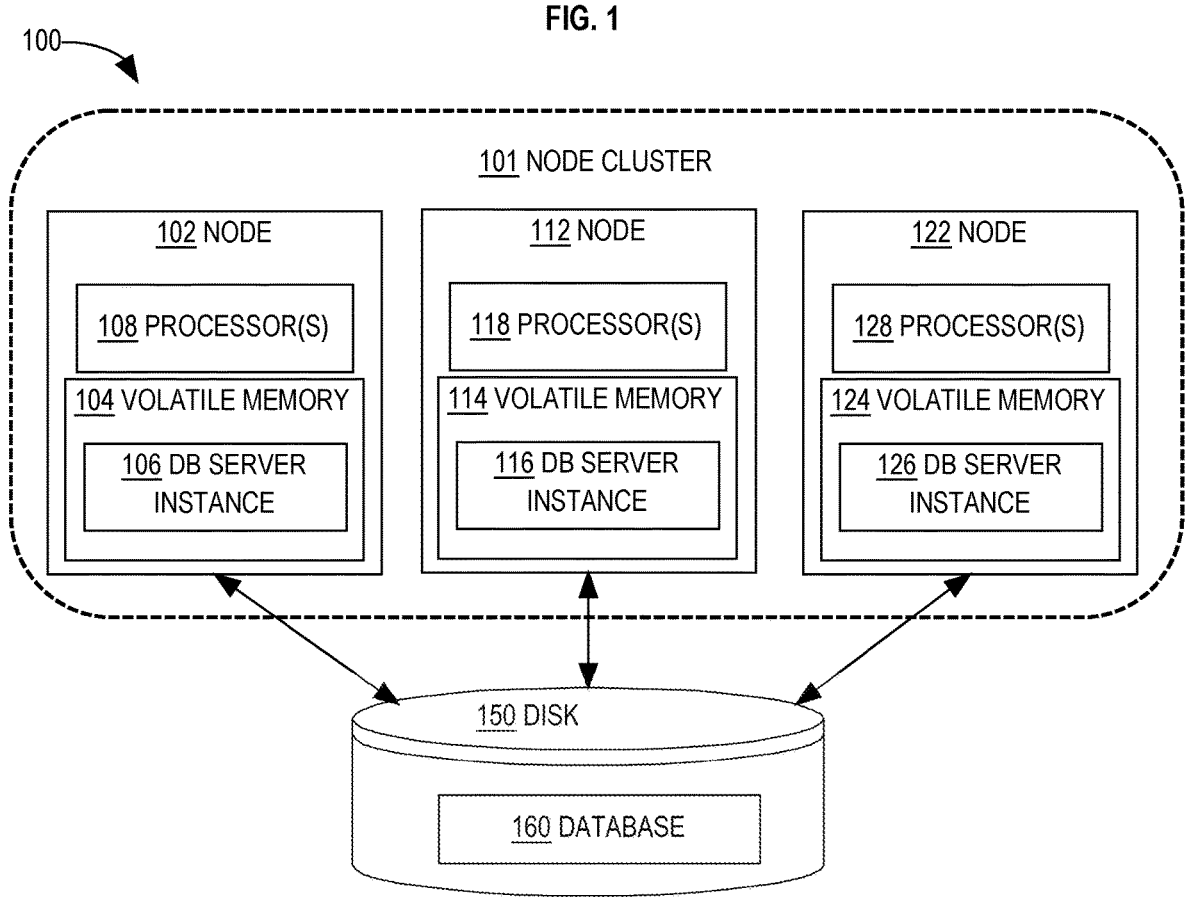
FIG. 1 depicts a multi-node database system on which an embodiment may be implemented.

FIG. 1 depicts a multi-node database system on which an embodiment may be implemented. In the embodiment illustrated in FIG. 1, system 100 represents a DBMS and comprises node cluster 101 of three nodes 102, 112, and 122. Although three nodes are shown in the present illustration, in other embodiments, system 100 may comprise more or fewer nodes.

Nodes 102, 112, and 122 in the node cluster 101 have access to the same database 160. For the purpose of illustration, database 160 is shown as stored on a single shared disk 150, but in alternative embodiments may be spread across multiple disks to which each of nodes 102, 112, and 122 have access.

Nodes 102, 112, and 122 respectively have one or more processors 108, 118, and 128, and local RAM memory 104, 114, and 124. In addition, nodes 202, 212, and 222 are respectively executing database server instances 106, 116, and 126. While in the illustrated embodiment each node is executing a single database server instance, in alternative embodiments, a single node may execute more than one database server instance.

In an embodiment, any one of nodes 102, 112, and 122 of node cluster 101 may be designated as a coordinating node that receives database operations, such as queries, and assigns operations for completing the query to any of the other nodes for completion. For example, if node 102 is designated as the coordinating node, then node 102 may receive a query from a client computing device and may determine to allocate operations to node 112 and node 122 for completion. Operations may include processing portions of tuples from tables that are targeted by the query. For instance, if the query included a table scan of table1, then node 102 may assign a first portion of tuples from table1 to node 112 for scanning and assign a second portion of tuples from table1 to node 122 for scanning. Additionally, portions of tuples to be scanned may be further assigned to individual processing threads within each node.

Bitmap

A bitmap is a data structure that may be used to map boolean information for a large set of values into a relatively compact representation. Bitmaps may map a domain, such as a range of integers, to boolean values. For example, for a given expression S, the domain may represent all possible distinct values of expression S, and each bit in the bitmap may correspond to one of those distinct values. For any given value of the expression, the corresponding bit will have a value that indicates whether the value exists (bit set to 1) or does not exist (bit set to 0) in a particular set of data. However, if the range of distinct values for expression S is very large, then the size of the bitmap may be very large as well.

For example, assume that the target expression S is "age", that "age" has the possible values of 0 to 130. Assume that a bitmap is created to indicate the distinct age values in a particular table (TableX). If the "age" column of TableX only has three distinct ages (21, 31 and 33), then the bitmap will have the bits that correspond to the ages 21, 31 and 33 set to 1, and the remaining bits set to 0.

In an embodiment, in order to reduce the size of the bitmap, the bitmap may be divided into ranges of distinct values of expression S. For example, if the range of distinct values of expression S is from 0 to 999, then the bitmap may be partitioned into 10 smaller bitmap buckets, each with a range of 100. For instance, a first bitmap bucket may represent values from 0-99, a second bitmap bucket may represent values from 100-199, a third bitmap bucket may represent values from 200-299, and so on. Bitmap map buckets for the bitmap may be selectively instantiated in order to save storage space. For instance, a bitmap bucket for a particular range may not even be created if no value in the bitmap bucket's range is present in the corresponding set of data. In such an embodiment, the bitmap bucket may be instantiated when a value for expression S, which falls within the range of the bitmap bucket, is added to the corresponding set of data. When determining a distinct count for values of expression S, bits with boolean values set to 1 from each of the bitmap buckets may be summed to determine the total number of distinct values for expression S.

System 100 may implement a bitmap with a key-value pair of integer values. In the key-value pairs, values of expression S are the key, and a boolean value is the value. For instance, each possible integer value for expression S is set as a key in the key-value pair, and a corresponding boolean value is set to 1 if the integer value for expression S exists in the corresponding set of data (e.g. tuples from table1). If integer values for expression S do not exist based on the tuples in table1, then the corresponding boolean value is set to 0.

In an embodiment, the values for the expression represent discrete numerical values. In order to determine all possible values for expression S, the expression S values need to be limited to a discrete set of values, such as integer values.

Using a Bitmap for Count Distinct Calculation

SQL and many other database query languages have built in functions that may be used to format data and compute values from data. One such function is the SQL count function, which returns a total number of rows in the result set that satisfy the criteria specified in the where clause. A SQL count function with the "distinct" clause, herein referred to as count distinct, eliminates repetitive values from the result set and returns a count of the number of rows that have unique values satisfying the criteria of the where clause.

In an embodiment, a bitmap may be used to perform count distinct operations on an expression. The following is an example SQL query with a count distinct operation:

```
select COUNT (DISTINCT expression S)
from table1
group by <query-group-by-keys>;
```

In an embodiment, using a bitmap to perform count distinct operations on an expression may be divided into multiple phases, including a bitmap bucketization and construction phase (P1), a bitmap bucket merging phase (P2), and a bitmap counting phase (P3).

The bitmap bucketization and construction phase (P1) includes operations of evaluating the expression S for each tuple from a table specified in the query, generating corresponding bitmap buckets, and updating boolean values that correspond to calculated integer values for expression S. The bitmap bucket merging phase (P2) includes operations for merging bitmap buckets and keeping track of corresponding bitmap values. The bitmap bucket counting phase (P3) includes calculating a sum of counts of calculated integer values for expression S.

Bitmap Bucketization and Construction Phase

Figure 2:
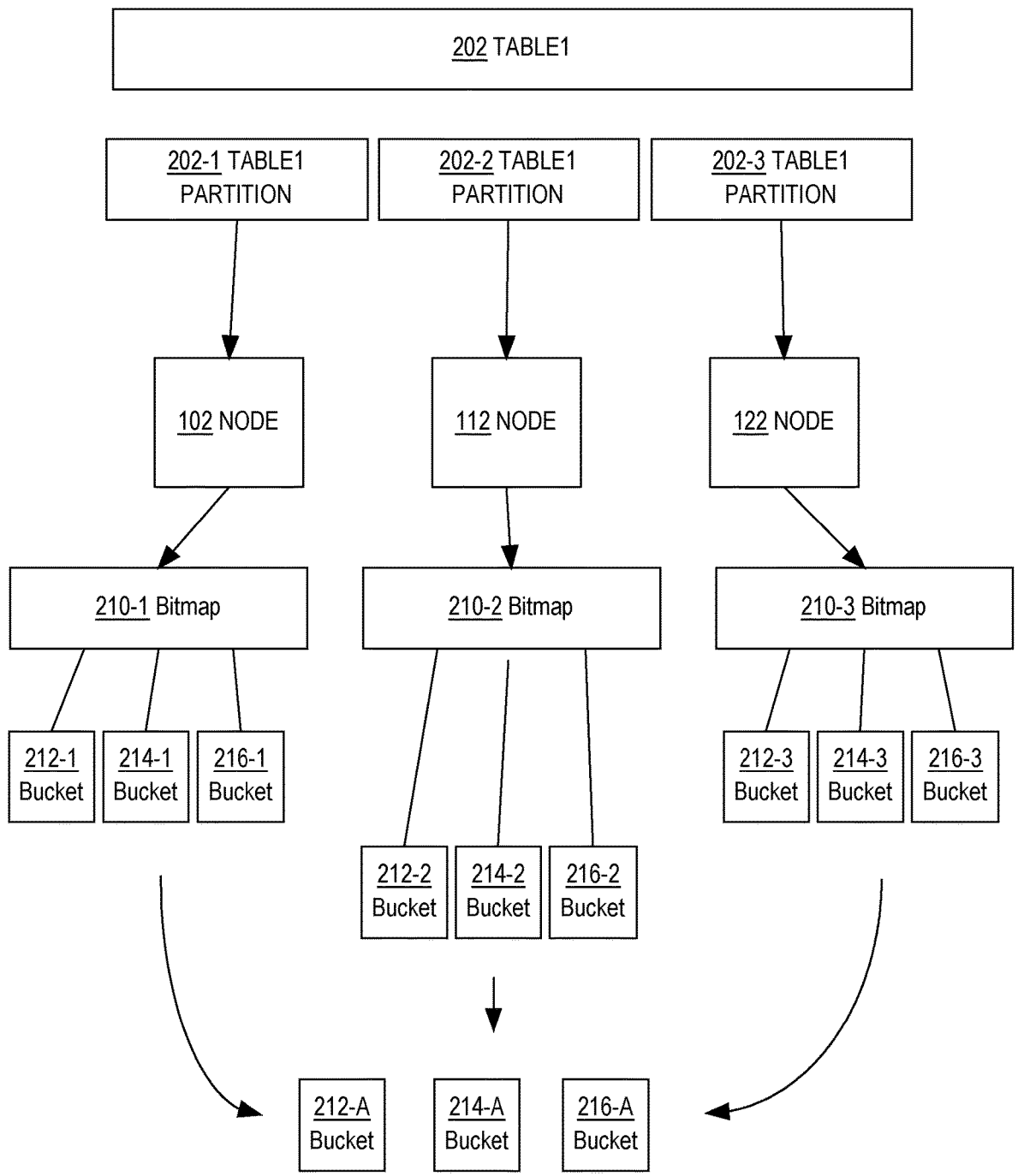
FIG. 2 depicts an example illustration of partitioning table scan operations for a query and generating and populating bitmaps for determining a distinct count for an expression of the query, in an embodiment.

In an embodiment, node 102 of the node cluster 101 may receive a request to execute:

```
select COUNT (DISTINCT expression S)
from table1
group by <query-group-by-keys>;
```

Where node 102 is designated as the coordinating node. Node 102 may partition table scan operations and assign partitions of the table scan operation to available processors on nodes 102, 112, and 122. The number of partitions for the table scan may be based upon the number of processors and nodes available to process the table scan operation. For instance, if there is one processor per node available (for nodes 102, 112, and 122), then node 102 may divide the table scan operation into three partitions. FIG. 2 depicts an example illustration of partitioning table scan operations for a query and generating and populating bitmap buckets for determining a distinct count for an expression of the query. Table1 202 represents the set of tuples that make up table1 for the received query. Node 102 may partition the set of tuples in table1 202 into three partitions of tuples that include table1 partition 202-1, table1 partition 202-2, table1 partition 202-3. Each table1 partition may be assigned to a node for processing. For example, node 102 may assign table1 partition 202-1 to a processor on node 102, assign table1 partition 202-2 to a processor on node 112, and assign table1 partition 202-3 to a processor on node 122. Each node may perform the assigned table scans in parallel.

Each of the nodes 102, 112, and 122 may be configured to allocate memory for a set of bitmap buckets that cover all possible values for expression S of the received database query. Referring to FIG. 2, bitmap 210-1 represents allocated memory, in volatile memory 104 of node 102, for a bitmap that represents all possible values for expression S. Bitmap 210-2 represents allocated memory, in volatile memory 114 of node 112, for a bitmap that represents all possible values for expression S and bitmap 210-3 represents allocated memory, in volatile memory 124 of node 122, for a bitmap that represents all possible values for expression S. Each of the bitmaps 210-1, 210-2, and 210-3 separately cover all possible values for expression S of the received database query.

Each of the bitmaps 210-1, 210-2, and 210-3 may be bucketized into an equal number of bitmap buckets. For instance, bitmap 210-1 may be bucketized into bitmap buckets 212-1, 214-1, and 216-1. Bitmap bucket 212-1 represents an integer value range of 0-199, bitmap bucket 214-1 represents an integer value range of 200-399, and bitmap bucket 216-1 represents an integer value range of 400-599, where the entire range of integer values for expression S in bitmap 210-1 is 0-599. In an embodiment, each of the nodes 102, 112, and 122 may generate a corresponding bitmap bucket only in response to determining that an integer value for expression S belongs in the corresponding bitmap bucket. For example, node 102 may calculate an integer value for expression S for a first tuple as 101. Node 102 may then generate the bitmap bucket 212-1, which covers an integer value range of 0-199, and set the boolean value for the bit corresponding to the integer value 101 (first tuple) to 1.

In an embodiment, received operations may include evaluating expression S for each tuple by performing a table scan on each of the table partitions 202-1, 202-2, and 202-3. For instance, node 102 may calculate expression S values for each tuple within table partition 202-1, node 112 may calculate expression S values for each tuple within table partition 202-1, and node 122 may calculate expression S values for each tuple within table partition 202-1. In an embodiment, for each tuple in table1 partition 202-1, node 102 may, for the given tuple, determine an integer value for the expression S. Node 102 may then determine which bitmap bucket of bitmap 210-1 corresponds to the range in which the determined integer value falls. For example, if the determined integer value for the given tuple is 51, then node 102 may determine that the integer value belongs in bitmap bucket 212-1, which represents the integer value range from 0-199. Node 102 may then determine whether bitmap bucket 212-1 already exists in volatile memory 104. Bitmap bucket 212-1 may already exist in volatile memory 104 if node 102 had previously generated the bitmap bucket 212-1.

If bitmap bucket 212-1 already exists in volatile memory 104, then node 102 may set the corresponding boolean value for the bit corresponding to the integer value 51 to 1. If bitmap bucket 212-1 does not exist in volatile memory 104, then node 102 may generate bitmap bucket 212-1, set all the bit values for the newly generated bitmap bucket 212-1 to 0, and then set the corresponding boolean value for the bit corresponding to integer value 51 to 1. Upon calculating the integer values for each tuple in table partition 202-1 and setting corresponding boolean values for each of the integer values in bitmap bucket 212-1, 214-1, and 216-1, positions within bitmap bucket 212-1, 214-1, and 216-1 that contain a boolean values set to 1, represent existing integer values for expression S for the tuples in table partition 202-1.

Bitmap Bucket Merging Phase

As described, tuples of table1 may be partitioned and assigned to each of the nodes 102, 112, and 122 for expression S calculation and bitmap bucket generation. For instance, node 102 generated bitmap buckets 212-1, 214-1, and 216-1 for the corresponding bitmap 210-1. Node 112 generated bitmap buckets 212-2, 214-2, and 216-2 for the corresponding bitmap 210-2, and node 122 generated bitmap buckets 212-3, 214-3, and 216-3 for the corresponding bitmap 210-3. Each of the sets of bitmap buckets (212-1, 214-1, and 216-1), (212-2, 214-2, and 216-2), (212-3, 214-3, and 216-3) represents the same range of possible integer values for expression S. For example, bitmap buckets 212-1, 212-2, and 212-3 each represent the integer value range of 0-199, bitmap buckets 214-1, 214-2, and 214-3 each represent the integer value range of 200-399, bitmap buckets 216-1, 216-2, and 216-3 each represent the integer value range of 400-599.

During the bitmap bucket merging phase, all bitmap buckets that correspond to a given range are merged with all other bitmap buckets that correspond to the same given range. Merging the buckets in this manner produces a single set of bitmap buckets, where one bitmap bucket corresponds to each distinct range. For example, bitmap buckets 212-1, 212-2, and 212-3 are merged to generate a merged bitmap bucket 212-A that corresponds to range 0-199. In an embodiment, merging of corresponding bitmap buckets may be implemented using an OR function on corresponding boolean values from the bitmap buckets. For example, if any of the boolean values in bitmap buckets 212-1, 212-2, and 212-3 for a particular integer value is set to 1, then the boolean value for the particular integer value in the bitmap bucket 212-A will be set to 1. If however, each of the boolean values for the particular integer value are set to 0, then the boolean value for the particular integer value in bitmap bucket 212-A will be set to 0. By using the OR function, each unique integer value represented in each of the corresponding bitmap buckets that has a boolean value set to 1 is only counted once. In an embodiment, node 102 may then compute counts for each of the bitmap buckets 212-A, 214-A, and 216-A in order to determine distinct counts for existing integer values for expression S.

Bitmap Bucket Counting Phase

During the bitmap count phase, node 102 may sum the computed counts of each of the bitmap buckets 212-A, 214-A, and 216-A to determine a total distinct count for expression S.

Defined SQL Functions

System 100 may implement new SQL functions for constructing bitmaps and bitmap buckets, populating the bitmap buckets, merging the bitmap buckets, and counting the unique integer values for the desired expression.

The BITMAP_CONSTRUCT_AGG_Function

In an embodiment, system 100 implements a BITMAP_CONSTRUCT_AGG function which, when called, generates a bitmap if the bitmap does not already exist, that has bitmap positions that correspond to all possible values for a given expression. The input for the BITMAP_CONSTRUCT_AGG function are values for the given expression, where the values are non-negative integer values. The function receives the values for the given expression and sets the bit positions corresponding to the values for the given expression to 1 within the bitmap. The output is the bitmap representation of the input values where bitmap positions corresponding to the input values are set to 1. For example, if an expression V maps to possible values 0-9 and the input values include the set of [0,1,2,3], then the output of the BITMAP_CONSTRUCT_AGG is a bitmap representations for the possible values of expression V where bits corresponding to positions [0,1,2,3] are set to 1 and the remaining positions are set to 0.

The BITMAP_BUCKET_NUMBER Function

In an embodiment, system 100 implements a BITMAP_BUCKET_NUMBER function which, when called, determines a particular bitmap bucket, of the bitmap buckets, that contains a bit position corresponding to a particular integer value of the expression. Inputs for BITMAP_BUCKET_NUMBER function include the expression to be evaluated and a size in bits of the ranges for the bitmap buckets, where the size parameter is an optional parameter. For example, the BITMAP_BUCKET_NUMBER function may receive (a) expression V for a particular tuple and (b) the size of the range of bitmap buckets, which may indicate that each bitmap bucket has a range of 100 bits. The BITMAP_BUCKET_NUMBER function may determine that expression V for the particular tuple equals 101, and the function may output the second bucket as the bitmap bucket that corresponds to expression V (the second bitmap bucket range is 100-199, based on each bucket having ranges of 100 bits each).

The BITMAP_BIT_POSITION Function

In an embodiment, system 100 implements a BITMAP_BIT_POSITION function which, when called, determines a bit position relative to a provided bitmap bucket range. The BITMAP_BIT_POSITION function may receive, as input, the expression to be evaluated and a size, in bits, of the ranges of the bitmap buckets, where the size of ranges input is an optional input parameter. The output of the BITMAP_BIT_POSITION function is the bit corresponding to the value of the expression relative to the bitmap bucket range. Using the previous example, where expression V for the particular tuple equals 101, the BITMAP_BIT_POSITION function would output the bit position as 1 corresponding to 101, which is in the second bucket (range equal to 100-199).

The BITMAP_OR_AGG Function

In an embodiment, system 100 generates a BITMAP_OR_AGG function that is an aggregate function that receives as input a set of bitmap buckets to be merged. The BITMAP_OR_AGG function merges the set of bitmap buckets by performing OR operations on each corresponding bit within each of the set of bitmap buckets. The output of the BITMAP_OR_AGG function a single merged bitmap bucket. For example, the BITMAP_OR_AGG function may receive as input bitmap buckets 212-1, 212-2, and 212-3 and may output a merged bitmap bucket 212-A.

The BITMAP_COUNT Function

In an embodiment, system 100 generates a BITMAP_COUNT function that is a scalar function that receives, as input, a bitmap bucket and returns as output a count of the bits with boolean values set to 1 in the corresponding bitmap bucket.

Rewriting a Distinct Count Query

System 100 may use the new SQL functions to rewrite a DISTINCT COUNT query to implement a bitmap to perform the count distinct operation using the three phases of bitmap bucketization and construction (P1), bitmap bucket merging (P2), and bitmap bucket counting (P3). Referring to the following database query:

```
SELECT COUNT(DISTINCT expression S)
FROM table1
GROUP BY <query-group-by-keys>;
```

The database query is counting the number of distinct integer values for expression S from the set of tuples in table1, where the counts are grouped by one or more keys from table1 <query-group-by-keys>.

The transformed database query may be represented as:

```
SELECT <query-group-by-keys>,
         BITMAP_COUNT(BITMAP_OR_AGG(bitmap)) as bitmap_count
    FROM
       (SELECT <query-group-by-keys>,
            BITMAP_CONSTRUCT_AGG(BITMAP_BIT_POSITION(expression
            , Size)) as bitmap,
            BITMAP_BUCKET_NUMBER(expression, Size) as bucket
       FROM TABLE1
       GROUP BY <query-group-by-keys>,
                BITMAP_BUCKET_NUMBER(expression, Size))
   GROUP BY <query-group-by-keys>;
```

In this rewritten query, the from clause has been transformed from selecting tuples directly from table1, to selecting tuples from an embedded query. The embedded query is a select statement from tuples from table1. The embedded select has three values selected. The first value is the one or more keys used to group the tuples. The second value is a bitmap bucket that is generated using the BITMAP_CONSTRUCT_AGG function which receives, as input, the output of the BITMAP_BIT_POSITION function. The input for the BITMAP_BIT_POSITION function is the expression S and the desired size of the bitmap buckets. The third value is a bitmap bucket number which is the output of the BITMAP_BUCKET_NUMBER function. The bitmap bucket generated by the BITMAP_CONSTRUCT_AGG function is the bitmap that corresponds to the bitmap bucket number generated by the BITMAP_BUCKET_NUMBER function. The embedded query selects tuples from table1 and the result is a set of bitmap buckets grouped by the one or more grouping keys and a bitmap bucket number. The outer select statement, when performed, outputs a distinct count values grouped by each key in table1.

Materialized Views

A materialized view is a database object that contains results of a database query and may be used as a snapshot of data at a specific period in time. In an embodiment, system 100 may store results of the above embedded query in a materialized view for the purpose of calculating a count distinct for an expression. System 100 may store the constructed bitmap buckets as well as other columns in a materialized view. By storing the bitmap buckets within a materialized view, system 100 may be able to reuse the results of the bitmap buckets for future count distinct query operations related to the same data. For example, the bitmap buckets from the above transformed database query may be stored in a materialized view and then may be used for future count distinct query operations. The materialized view generation step may be presented as:

```
CREATE MATERIALIZED VIEW MV
SELECT <group-by-keys>,
     BITMAP_CONSTRUCT_AGG(BITMAP_BIT_POSITION(expression, Size)) as
        bitmap,
     BITMAP_BUCKET_NUMBER(expression, Size) as bucket
FROM TABLE1
GROUP BY <group-by-keys>, BITMAP_BUCKET_NUMBER(expression, Size);
``` where the result set of the embedded SELECT statement from the previous transformed query is stored within the materialized view MV. The materialized view represents the bitmap bucketization and construction phase (P1) and results in the MV data object that contains columns for a key value, the bitmap bucket, and a bitmap bucket number.

In an embodiment, the bitmap bucket merging phase (P2) and the bitmap bucket counting phase (P3) may represent a rewritten query that queries the materialized view MV. The rewritten query for phases P2 and P3 may be represented as:

```
SELECT SUM(bitmap_count)
FROM (SELECT <query-group-by-keys>,
          BITMAP_COUNT(BITMAP_OR_AGG(bitmap)) as bitmap_count
      FROM MV
      GROUP BY <query-group-by-keys>, bucket)
GROUP BY <query-group-by-keys>;
``` where the from clause includes an embedded select from the materialized view MV. The embedded select statement includes the BITMAP_OR_AGG function that aggregates each of the bitmap buckets covering the same range and output a single merged bitmap bucket. The merged bitmap bucket is provided as input for the BITMAP_COUNT function to count the number of bits set to 1 from the merged bitmap bucket. The output of the select statement is a result set of counts for each of the merged bitmap buckets. Using FIG. 2 as an example, the output of the select statement would be a result set of the counts of bitmap buckets 212-A, 214-A, and 216-A.

In the described materialized view MV, the result set stored in MV focuses on storing bitmap data, grouped using one or more keys, for the purpose of performing a count distinct on the provided expression S. In an embodiment, the result set to be stored within the MV may be grouped at a finer level of granularity than what is needed for a particular query. For example, if a received query requests a count distinct of a property value from table1 for each State within a particular country, such as the United States of America, then the result set stored within the MV may be grouped at a State level, for the United States of America, in order to satisfy the requested query. However, then the MV may only be used to compute count distinct queries requesting counts at a State level. If another query requests a count distinct of properties grouped at a county within a State level, then a new materialized view would have to be generated that groups data from table1 at a county level.

A result set stored in a materialized view may be grouped at a finer level of granularity than what is needed for a requested query. For example, if a table T2 includes the following columns: T2 [State, County, property1, property2], then a result set that is grouped at a county, State level may be stored within a materialized view and may be used for count distinct queries requesting counts at either a State level or a county level. For the count distinct request grouped at a State level, result set from the materialized view may be grouped and counted at a state level within an embedded select statement that retrieves data from the materialized view. For example, a query of T2 that requests a count distinct for property 1 grouped at a State level may be represented as:

```
SELECT T2.State, COUNT(DISTINCT T2.prop1)
FROM T2
GROUP BY T2.State
```

A second query of T2 that requests a count distinct for prop 1 grouped at a County level may be represented as:

```
SELECT T2.County, T2.State, COUNT(DISTINCT T2.prop1)
FROM T2
GROUP BY T2.County, T2.State
```

Materialized view, MV1, that includes bitmap buckets for tuples of T2 at a county level of granularity may be used for both of the above example queries. For the State level query, the results stored in MV1 may be rolled up and grouped at a State level, where the transformed query merges each county-level bitmap for each particular State together. For the county-level query, the results stored in MV1 may be queried without the need to roll up county-level bitmaps to the State level.

The materialized view MV1 may be defined as:

```
CREATE MATERIALIZED VIEW MV1 AS
SELECT T2.State, T2.County,
    BITMAP_BUCKET_NUMBER(T2.prop1) as bktno,
    BITMAP_CONSTRUCT_AGG(BITMAP_BIT_POSITION(T2.prop1)) as bitmap
FROM T2
GROUP BY T2.County, T2.State, BITMAP_BUCKET_NUMBER(T2.prop1)
``` where the result set of MV1 is grouped by county, State, and bitmap bucket number. By grouping the results by county and State, the materialized view may be used in queries that perform a count distinct at either a county-level or a State-level.

For example, the State-level count distinct query may be transformed to utilize MV1 as:

```
SELECT T2.State, SUM(cnt_1)
FROM (SELECT T2.State,
        BITMAP_COUNT(BITMAP_OR_AGG(bitmap)) as cnt_1,
    FROM MV1
    GROUP BY T2.State, bktno
    )
GROUP BY T2.State
``` where the bitmap buckets within MV1 are at a county-level and the embedded select statement from MV1 merges bitmap buckets based upon their corresponding State value. This is reflected in the "GROUP BY T2.State, bktno" which groups results by State and bucket number.

In an embodiment, result sets stored in materialized views may be further expanded to include aggregate values or any other calculated values that may be calculated from select statements. For example, property2 from table T2 may be aggregated using a SUM function and stored within the materialized view, MV1. An updated MV1, which includes an aggregated value may be represented as:

```
CREATE MATERIALIZED VIEW MV1 AS
SELECT T2.State, T2.County, SUM(T2.prop2),
    BITMAP_BUCKET_NUMBER(T2.prop1) as bktno,
    BITMAP_CONSTRUCT_AGG(BITMAP_BIT_POSITION(T2.prop1)) as bitmap
FROM T2
GROUP BY T2.County, T2.State, BITMAP_BUCKET_NUMBER(T2.prop1)
``` where the result set of MV1 includes aggregated values for property2 grouped by county, State, and bitmap bucket number.

Using Materialized View to Perform Count Distinct Queries

Figure 3:
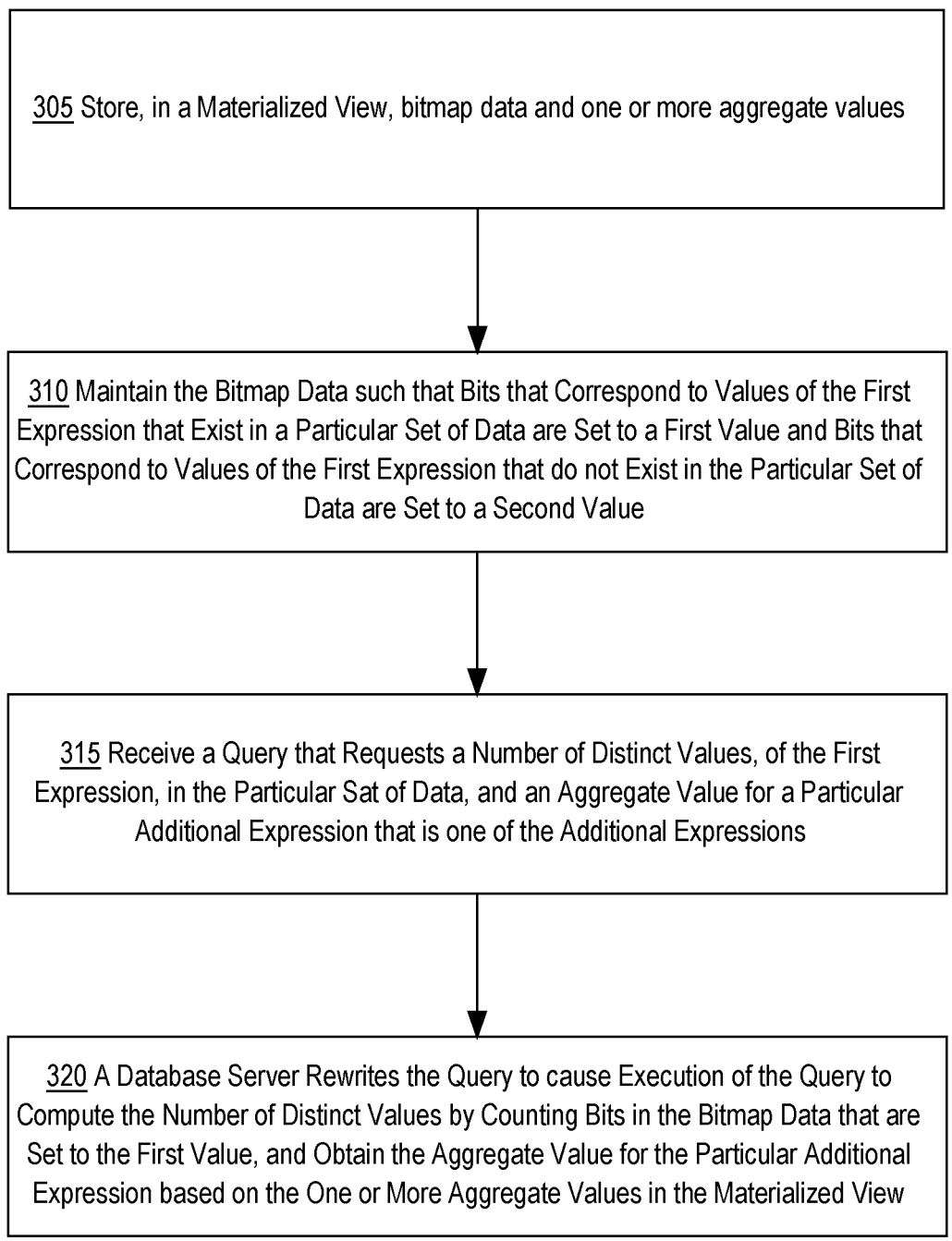
FIG. 3 is a flowchart that illustrates steps for storing bitmap data, within a materialized view, of possible distinct values of a first expression and one or more aggregate values of additional expressions, receiving a query with a count distinct function for the first expression, and rewriting the query to compute the distinct count using data stored in the materialized view, according to an embodiment.

The techniques described herein involve using a materialized view, which contains bitmap buckets representing possible target expression values and aggregate target expression values, to execute a query that includes a count distinct function. FIG. 3 is a flowchart that illustrates steps for storing, within a materialized view, bitmap data of possible distinct values of a first expression and one or more aggregate values of additional expressions, receiving a query for a distinct count of the number of existing values for the first expression for a set of data, and rewriting the query to compute the distinct count using data stored in the materialized view, according to an embodiment.

At step 305, system 100 stores in a materialized view, bitmap data that represents a bitmap in which each bit represents each possible distinct value of a first expression and one or more aggregate values for additional expressions. In an embodiment, node 102 of system 100 is designated as a coordinating node and generates a materialized view configured to store the bitmap data for the first expression and the one or more aggregate values for the additional expressions. Determining which expressions should be stored within a materialized view may be based upon previously received queries that include the first expression and the additional expressions, an aggregation of historical queries of one or more tables, or any other metrics of historical queries that indicate that a materialized view should be generated for the first expression and additional expressions, such as expressions that compute aggregate values. For example, node 102 may have previously received queries for table 2 that include a count distinct of property 1 and an aggregated function, such as a SUM function of property2. Determining the format of the materialized view, such as how to group data, may be based on the historical frequency of various queries on tables or any other metric derived from the historical database queries received by node 102.

In one example, where table2 has columns [State, County, prop1, prop2], node 102 may have received multiple database queries (query A) that include a count distinct of T2.prop1 grouped at a State level, as:

---
SELECT T2.State, COUNT(DISTINCT T2.prop1), SUM(T2.prop2)
FROM T2
GROUP BY T2.State
---

In another example, node 102 may have received other multiple database queries (query B) that include a count distinct of T2.prop1 grouped at a county and State level, as:

---
SELECT T2.State, T2.County, COUNT(DISTINCT T2.prop1), SUM(T2.prop2)
FROM T2
GROUP BY T2.County, T2.State
---

Each of the queries, query A and query B, include a count distinct of column prop1 and a sum function of column prop2. In query A, the result set is grouped at a State-level, while the result set for query B is grouped at a finer level of granularity, at a county-level. In an embodiment, node 102 may generate a materialized view that stores data from table2 at a level of granularity that represents grouping at a county, State level. The materialized view may be represented as:

---
CREATE MATERIALIZED VIEW MV1 AS
SELECT T2.County, T2.State,
    BITMAP_BUCKET_NUMBER(T2.prop1) as bktno,
    BITMAP_CONSTRUCT_AGG(BITMAP_BIT_POSITION(T2.prop1)) as bitmap
    SUM(T2.prop2) as agg_prop2
FROM T2
GROUP BY T2.County, T2.State, BITMAP_BUCKET_NUMBER(T2.prop1)
--- where the result set stored in MV1 is grouped by county, State, and bitmap bucket. By grouping the results by county and State, the materialized view may be used in queries that perform a count distinct at either a county-level or a State-level.

The above example for generating the materialized view includes an additional expression which is a sum function for calculating the sum of property2. Additional expressions that may be stored within the materialized view are not limited to sum functions. In an embodiment, the additional expressions may include, but are not limited to, a sum function, an average function, a count function, a minimum function, a maximum function, and any other functions that calculate a value from an aggregate of input values.

In an embodiment, node 102 may partition the bitmap of the set of possible distinct values of the first expression into a plurality of bitmap buckets. Each bitmap bucket may correspond to a range of possible distinct values of the first expression. For example, if the possible values of the first expression range from 0-599, then node 102 may partition the bitmap into 6 bitmap buckets, where each bucket represents a range of 100 values. For instance, bucket 1 may represent the range of values between 0-99, bucket 2 may represent the range of values between 100-199, bucket 3 may represent the range of values between 200-299, and so on. In another example, node 102 may partition the bitmap into 3 buckets, where each bucket represents a range of 200 values. Bucket 1 may represent the range of values between 0-199, bucket 2 may represent the range of values between 200-399, and bucket 3 may represent the range of values between 400-599. Node 102 may determine the number of buckets to partition the bitmap based upon the number of possible values for the first expression, the available storage space for storing the bitmaps, the number of processors available to process incoming database queries, and any other factors that may affect storage space and processing time for database queries. In yet another example, if the set of possible values for the first expression is sufficiently small, then node 102 may determine that the bitmap does not need to be partitioned. In this case, materialized view MV1, as defined above, may still be used where the number of buckets is equal to 1.

In an embodiment, storing the bitmap data for the possible distinct values of the first expression and the one or more aggregate values for additional expressions into the materialized view may be executed by iterating over each of the tuples that make up the set of data that is the target of the database query. Using the above select statement for table 2, for each tuple in table2, node 102 evaluates the expression that is the target of the count distinct function. For example, the select query contains the count distinct function as "COUNT(DISTINCT T2.prop1)". Node 102 will evaluate T2.prop1 to determine the corresponding integer value for each tuple in table2. For each tuple's calculated integer value of the expression, node 102 determines which bitmap bucket range corresponds to the calculated integer value. For example, if the range of integer values is 0-599 and the corresponding bitmap bucket ranges are 0-199, 200-399, and 400-599, and the calculated integer value is 201, then node 102 would determine that integer value 201 belongs in the second bitmap bucket and its corresponding position is 201 out of the range 200-399. Upon determining the correct bitmap bucket and corresponding bitmap position within the corresponding bucket, node 102 may set the boolean value in the bitmap to 1, which represents the existence for the integer value 201 in the set of tuples from table 2.

In an embodiment, node 201 may be configured to generate corresponding bitmap buckets only when a particular integer value falls within the range of the corresponding bitmap bucket. This approach may be implemented because the entire range of possible integer values for the expression being evaluated may contain sparse data values where ranges of values may not exist in the set of tuples being evaluated. For example, if a range of possible integer values for an expression ranges from 0-9,999 and the current set of tuples evaluated only produced integer values that range from 0-999, then generating bitmap buckets covering ranges that do not include actual integer values for the current set of tuples may consume storage space that will otherwise not be used.

In an embodiment, upon determining an integer value for a particular tuple of table2, node 102 may determine whether the integer value falls into a range of an already instantiated bitmap bucket. If the integer value does not fall into the range of an already instantiated bitmap bucket, then node 102 may instantiate the particular bitmap bucket that has a range that overlaps with the integer value and sets the particular bit, within the particular bitmap bucket, that corresponds to the integer value to 1. For example where the integer value is 201, node 102 may determine whether the corresponding bitmap bucket covering the range of 200-399 has been instantiated. If the corresponding bitmap bucket (range of 200-399) has not been instantiated within memory, then node 102 will instantiate the corresponding bitmap bucket and then set the bit at position 201 to 1. If however, node 201 determines that the corresponding bitmap bucket already exists in memory, then node 201 set the bit corresponding to the position of the integer value to 1. For instance, if the corresponding bitmap bucket (range of 200-399) has already been instantiated, then node 201 will set the bit at position 201 to 1.

In an embodiment, while iterating over the set of tuples in table2, node 102 may also evaluate the one or more aggregate functions and update the corresponding column value based upon the outputs of the one or more aggregate functions. Using the above select example, for each tuple node 102 will evaluate the sum function for T2.prop2. For sum functions, node 102 may add the T2.prop2 to the existing value stored in the agg_prop2 column of the materialized view. If the aggregate function is a max function or a min function, then node 102 may compare the current value T2.prop2 for the current tuple against the existing value in the agg_prop2 column. For instance, if the aggregate function is a max function and the current value for agg_prop2 is 50 and the calculated value for the current tuple is 75, then node 102 may update the agg_prop2 value to 75. If however, the calculated value for the current tuple is 45 and the current value in the agg_prop2 is 50, then node 102 will not update the current value for agg_prop2 for the current record.

Referring back to FIG. 3, at step 310 system 100 maintains the bitmap data within the materialized view. In an embodiment, node 102 maintains the bitmap data such that bits in the bitmap correspond to values of the first expression that exist in a particular set of data are set to a first value and bits that correspond to values of the first expression that do not exist in the particular set of data are set to a second value. For example, node 102 may set bits corresponding to integer values of the first expression that exist, for the tuples evaluated, to 1 (the first value), while bits corresponding to integer values of the first expression that do not exist, for the tuples evaluated, remain as 0 (the second value). In an embodiment, upon instantiating the bitmap, each of the bits are initially set to 0. If bits correspond to integer values of the first expression, then the bits are set to 1, while the remaining bits remain set to 0 as they represent integer values of the first expression that do not exist.

The materialized view contains values of evaluated expressions for a set of data made up of tuples from one or more tables. Data within the tuples may be updated by one or more other processes. For example, an update request may update values within tuples corresponding to data within the materialized view. This may also include insertions or deletions of tuples, which may affect the tuples represented within the materialized view. As a result, data stored in a materialized view may need to be updated to accurately reflect the state of the data within the underlying one or more tables.

In another embodiment, node 102 may monitor the tables that contain the tuples corresponding to the materialized view and determine that one or more values of the first expression that exist in the tuples corresponding to the materialized view have changed. Upon determining the change, node 102 may go back to step 305 to recalculate values for the expression for the set of tuples and repopulate each of the bitmap buckets. This full update of the bitmap data may be possible because the bitmaps are used to count whether a distinct integer value exists for the given expression. The bitmaps are not enabled to keep track of the number of instances of a particular integer value; therefore if for a particular tuple, the integer value changes the bitmap does not know whether a different tuple also had the same integer value. As a result, node 102 cannot accurately change the bit value from 1 to 0 without knowing whether any other tuple in the set of tuples also does not have that particular integer value.

At step 315, system 100 receives a query that requests a number of distinct values, of a first expression, in the particular set of data, and an aggregate value for a particular additional expression that is part of the additional expressions. In an embodiment, node 102 may receive a query request that includes a count distinct function for column T2.prop1 of table2 and a sum function for T2.prop2. For example, node 102 may receive query A that includes a count distinct of T2.prop1 grouped a State level:

```
SELECT T2.State, COUNT(DISTINCT T2.prop1), SUM(T2.prop2)
FROM T2
GROUP BY T2.State
```

In response to receiving the query, at step 320, system 100 rewrites the query to cause execution of the query to compute the number of distinct values by counting bits in the bitmap data in the materialized view that are set to the first value, and obtain the aggregate value for the particular additional expression based on the one or more aggregate values in the materialized view. In an embodiment, node 102 rewrites the received query using the materialized view and the defined SQL queries for merging bitmap buckets and for counting bits in the merged bitmap buckets. Using the above example of query A, node 102 may rewrite query A using the stored materialized view MV1 which contains:

Materialized View MV1:
SELECT T2.County, T2.State,
    BITMAP_BUCKET_NUMBER(T2.prop1) as bktno,
    BITMAP_CONSTRUCT_AGG(BITMAP_BIT_POSITION(T2.prop1)) as bitmap
    SUM(T2.prop2) as agg_prop2
FROM T2
GROUP BY T2.County, T2.State, BITMAP_BUCKET_NUMBER(T2.prop1)

Node 102 may rewrite query A using MV1 as:

SELECT T2.State, SUM(cnt_1), SUM(outer_agg_prop2)
FROM (SELECT T2.State,
    BITMAP_COUNT(BITMAP_OR_AGG(bitmap)) as cnt_1,
    SUM(agg_prop2) as outer_agg_prop2
    FROM MV1
    GROUP BY T2.State, bktno
    )
GROUP BY T2.State where the embedded select statement selects, from MV1, the State value, a count of the bits set to 1 from merged bitmap buckets, and a summation of the agg_prop2 value which represents the table2 property value. The BITMAP_OR_AGG(bitmap) function aggregates each of the bitmap buckets covering the same range and output a single merged bitmap bucket. The BITMAP_COUNT function then counts the bits from the single merged bitmap bucket to determine a distinct count of the bits set to 1 in the single merged bitmap bucket. The embedded select statement is grouped by State and bktno (bitmap bucket), which means that each of the bitmap buckets referring to counties within a particular State are rolled up into a single merged bitmap and the cnt_1 represents the total distinct count for values associated with the particular State.

The outer select statement "SELECT T2.State, SUM (cnt_1), SUM(outer_agg_prop2)" contains a SUM(cnt_1) function that sums the counts from each of the merged bitmap buckets to output a total count value as the total count distinct value. The SUM(outer_agg_prop2) function sums the aggregated values of agg_prop2 to output a total sum value grouped by State for T2.prop2.

In an embodiment, node 102 may execute the rewritten query to produce the requested result set. For example, if the original count distinct query request came from a client device, then node 102 would provide the result set to client device.

Using Multiple Materialized Views to Perform Count Distinct Queries

In an embodiment, two or more materialized views may be generated and used to rewrite a query that contains two or more count distinct functions. For example, the following tables table2 and table 3 may be part of a query C that contains two count distinct functions as well as multiple aggregate functions:

Table2: [State, County, prop1, prop2]
Table3: [prop3, prop4, prop5, County]
Query C:
SELECT T2.State, COUNT(DISTINCT T2.prop1), COUNT(DISTINCT T3.prop3),
    SUM(T2.prop2), MIN(T3.prop4)
FROM T2, T3
WHERE T2.prop1=T3.prop5
GROUP BY T2.State where query C contains a join of table2 and table3 based on the where clause T2.prop1=T3.prop5.

Referring to the steps in FIG. 3, at step 305 node 102 may generate and store two materialized views, one for storing a bitmap of values of the T2.prop1 expression and another for storing a bitmap of values of the T3.prop3 expression. The first materialized view may be generated as:

Create Materialized View MV2 AS
    SELECT T2.County, T2.State,
        BITMAP_BUCKET_NUMBER(T2.prop1) as bktno,
        BITMAP_CONSTRUCT_AGG(BITMAP_BIT_POSITION(T2.prop1)) as bitmap,
        SUM(T2.prop2) as agg_prop2, MIN(T3.prop4) as agg_prop4
    FROM T2, T3
    WHERE T2.prop1=T3.prop5
    GROUP BY T2.County, T2.State, BITMAP_BUCKET_NUMBER(T2.prop1)

where MV2 is similar to the previous example MV1, except MV2 contains an additional column for the MIN function on T3.prop4 and the select statement contains the where clause T2.prop1=T3.prop5.

The second materialized view may be generated as:

```
Create Materialized View MV3 AS
SELECT T2.County, T2.State,
    BITMAP_BUCKET_NUMBER(T3.prop3) as bktno,
    BITMAP_CONSTRUCT_AGG(BITMAP_BIT_POSITION(T3.prop3)) as bitmap,
    0 as agg_prop2, MFN(T3.prop4) as agg_prop4
FROM T2, T3
WHERE T2.prop1=T3.prop5
GROUP BY T2.County, T2.State, BITMAP_BUCKET_NUMBER(T3.prop3)
``` where MV3 is based on a select statement of the T2.County, T2.State, a bitmap bucket number (bktno), bitmap buckets for the second expression T3.prop3, a zero placeholder for aggregate of T2.prop2, and a minimum value for T3.prop4. In an embodiment, zero placeholders may be used for the purpose of making each of the materialized views symmetrical during a union. The sum value for T2.prop2 is already being tracked in MV2, thus the zero placeholder column in MV3 is optional and may be used for depicting a clear union between the materialized views. In another embodiment, MV3 may omit the agg_prop2 zero placeholder column.

At step 310, node 102 may maintain the bitmap data in both MV2 and MV3. Bits that correspond to values of the T2.prop1 expression in MV2 that exist in the particular set of data are set to the first value, such as 1, and bits that correspond to values that do not exist in the particular set of data are set to a second value, such as 0. Bits that correspond to values of the T3.prop3 expression in MV3 that exist in the particular set of data are set to the first value and bits that correspond to values that do not exist in the particular set of data are set to the second value. In an embodiment, node 102 may monitor data values in each of table2 and table3 and if values change for tuples in either table2 or table3, then node 102 may go back to step 305 to recalculate values for each of the expressions for the set of tuples from table2 and table3 and repopulate each of the bitmap buckets corresponding to MV2 and MV3.

At step 315, node 102 receives a query that requests a number of distinct values for the first expression and a number of distinct values for the second expression, in the particular set of data, and aggregate values for the particular additional expressions that are part of the additional expressions. For example, node 102 may receive a query request specifying query C, as described above.

At step 320, node 102 rewrites query C to cause execution of the query to compute the number of distinct values for the first expression by counting bits in the bitmap data in MV2 that are set to the first value, compute the number of distinct values for the second expression by counting bits in the bitmap data in MV3 that are set to the first value, and calculate the aggregate values for the particular additional expressions based on the one or more aggregate values in materialized views MV2 and MV3. In an embodiment, node 102 rewrites the received query C using materialized views MV2 and MV3 and the defined SQL queries for merging bitmap buckets and for counting bits in the merged bitmap buckets. The rewritten query C may be represented as:

```
SELECT State, SUM(cnt_1), SUM(cnt_2), SUM(outer_agg_prop2), MIN(outer_agg_prop4)
FROM (
    SELECT State,
        BITMAP_COUNT(BITMAP_OR_AGG(bitmap)) as cnt_1,
        0 as cnt_2,
        SUM(agg_prop2) as outer_agg_prop2, MIN(agg_prop4) as outer_agg_prop4
    FROM MV2
    GROUP BY State, bktno
UNION ALL
    SELECT State,
        0 as cnt_1,
        BITMAP_COUNT(BITMAP_OR_AGG(bitmap)) as cnt_2,
        0 as outer_agg_prop2, MIN(agg_prop4) as outer_agg_prop4
    FROM MV3
    GROUP BY State, bktno
)
GROUP BY State
``` where the first embedded select statement from MV2 selects the State value, a count of the bits set to 1 from merged bitmap buckets for the first expression, a zero placeholder for the count of bits referring to the second expression which is not tracked by MV3, a summation of the agg_prop2 value which represents the table2 property value, and a calculated minimum value for prop4 from table3. The select statement from MV2 is combined with the select statement from MV3 using a UNION ALL command. The zero placeholder for the count of bits referring to the second expression is used for the purpose of depicting a clearly readable UNION ALL command.

The second embedded select statement from MV3 selects the State value, a zero placeholder for the count of bits referring to the first expression which are tracked by MV2, a count of the bits set to 1 from merged bitmap buckets for the second expression, a zero placeholder for the agg_prop2 value, and a calculated minimum value for prop4 from table3. The zero placeholder for the agg_prop2 value is used because the aggregate calculation is tracked in MV2, not MV3; thus the zero placeholder is used.

The outer select statement "SELECT T2.State, SUM (cnt_1), SUM(cnt_2), SUM(outer_agg_prop2), MIN (outer_agg_prop4)" contains the SUM(cnt_1) function that sums the counts from each of the merged bitmap buckets, for the first expression in MV2, to output a total count value as the total count distinct value. The SUM(cnt_2) function that sums the counts from each of the merged bitmap buckets, for the second expression in MV3, to output a total count value as the total count distinct value. The SUM (outer_agg_prop2) function sums the aggregated values of agg_prop2 to output a total sum value grouped by State for T2.prop2. The MIN(outer_agg_prop4) function outputs the minimum value for agg_prop4 from either of the materialized views MV2 and MV3.

In an embodiment, additional materialized views may be used to store bitmaps for other target expression values that may be part of any other select statement. Select statements with multiple count distinct functions are not limited to multi-table joins. Multiple materialized views may be generated and stored based upon the number of count distinct functions. For example, if a select statement contained a count distinct function for column A in table 4 and another count distinct for column B in table 4, then node 102 may generate a materialized view that contains bitmap buckets for the possible target expression values for column A and another materialized view that contains bitmap buckets for the possible target expression values for column B.

In an embodiment, rewriting select statements with two or more count distinct functions may utilize an existing materialized view for one count distinct even if the other count distinct functions do not have a corresponding materialized view. Using the example for query C where MV2 has been generated but MV3 has not been generated, node 102 may rewrite query C where the UNION ALL command performs a union between a select from MV2 with an embedded select that performs the count distinct function either using conventional methods or by generating bitmaps on demand without storing the data within a new materialized view. For instance the rewritten query C, using conventional count distinct implementations for T3.prop3, may be represented as:

```
SELECT State, SUM(outer_cnt_1), SUM(outer_cnt_2), SUM(outer_agg_prop2),
MIN(outer_agg_prop4)
FROM
(
SELECT State,
        SUM(cnt_1) as outer_cnt_1,
        0 as outer_cnt_2,
        SUM(inner_agg_prop2) as outer_agg_prop2,
        MIN(inner_agg_prop4) as outer_agg_prop4
FROM
    (
    SELECT State,
            BITMAP_COUNT(BITMAP_OR_AGG(bitmap)) as cnt_1,
            SUM(agg_prop2) as inner_agg_prop2,
            MIN(agg_prop4) as inner_agg_prop4
    FROM MV2
    GROUP BY State, bktno
    )
GROUP BY State
UNION ALL
SELECT T2.State as State,
        0 as outer_cnt_1,
        COUNT(DISTINCT T3.prop3) as outer_cnt_2,
        0 as outer_agg_prop2,
        MIN(T3.prop4) as outer_agg_prop4
FROM T2, T3
WHERE T2.prop1=T3.prop5
GROUP BY T2.State
)
GROUP BY State
```

Queries that contain two or more count distinct expressions may be rewritten using one or more materialized views. Using an example table "tab" defined as:
tab (k1 NUMBER,
   k2 NUMBER,
   e1 NUMBER,
   e2 NUMBER,
   e3 NUMBER,
   e4 NUMBER)
where k1 and k2 are group by keys, e1 and e2 are distinct count expressions, and e3 and e4 are aggregate expressions. The following example queries may be rewritten using one or more materialized views:

```
SELECT k1, COUNT(DISTINCT e1) as dcnt_e1, SUM(e3) as sum_e3
FROM tab
GROUP BY k1;
SELECT k1, k2, COUNT(DISTINCT e2) as dcnt_e2, MAX(e4) as max_e4,
FROM tab
GROUP BY k1, k2;
```

In one embodiment, two materialized views may be generated where a first materialized view stores bitmap buckets for a first count distinct expression and a second materialized view stores bitmap buckets for a second count distinct expression. For example, the two materialized view may be created using the following code:

```
CREATE MATERIALIZED VIEW mv1 AS
SELECT k1, k2,
       BITMAP_BUCKET_NUMBER(e1) as bitmap_bkt_no,
       BITMAP_CONSTRUCT_AGG(BITMAP_BIT_POSITION(e1)) as bitmap_bkt,
       SUM(e3) as sum_e3,
       MAX(e4) as max_e4
FROM tab
GROUP BY k1, k2, BITMAP_BUCKET_NUMBER(e1);
CREATE MATERIALIZED VIEW mv2 AS
SELECT k1, k2,
       BITMAP_BUCKET_NUMBER(e2) as bitmap_bkt_no,
       BITMAP_CONSTRUCT_AGG(BITMAP_BIT_POSITION(e2)) as bitmap_bkt,
       SUM(e3) as sum_e3,
       MAX(e4) as max_e4
FROM tab
GROUP BY k1, k2, BITMAP_BUCKET_NUMBER(e2);
``` where mv1 contains bitmap buckets for determining a distinct count of expression e1 and mv2 contains bitmap buckets for determining a distinct count of expression e2.

The above example queries may then be rewritten using materialized views mv1 and mv2 to compute distinct counts for expressions e1 and e2, as:

```
SELECT k1, SUM(bitmap_cnt) as dcnt_e1, SUM(sum_e3) as sum_e3
FROM (
    SELECT k1, bitmap_bkt_no,
        BITMAP_COUNT(BITMAP_OR_AGG(bitmap_bkt)) as bitmap_cnt,
        SUM(sum_e3) as sum_e3
    FROM mv1
    GROUP BY k1, bitmap_bkt_no
    )
GROUP BY k1;
SELECT k1, k2, SUM(bitmap_cnt) as dcnt_e2, MAX(max_e4) as max_e4
FROM (
    SELECT k1, k2, bitmap_bkt_no,
        BITMAP_COUNT(BITMAP_OR_AGG(bitmap_bkt)) as bitmap_cnt,
        MAX(max_e4) as max_e4
    FROM mv2
    GROUP BY k1, k2, bitmap_bkt_no
    )
GROUP BY k1, k2;
```

In another embodiment, count distinct values for expressions e1 and e2 may be calculated using a single materialized view. The single materialized view may store bitmap buckets for each count distinct expression as concatenated rows in the single materialized view. For instance, the single materialized view may be created using the following code:

```
CREATE MATERIALIZED VIEW mv_concat AS
    SELECT k1, k2,
        BITMAP_BUCKET_NUMBER(e1) as bitmap_bkt_no,
        BITMAP_CONSTRUCT_AGG(BITMAP_BIT_POSITION(e1)) as bitmap_bkt,
        1 as bm_marker,
        SUM(e3) as sum_e3,
        MAX(e4) as max_e4
    FROM tab
    GROUP BY k1, k2, BITMAP_BUCKET_NUMBER(e1)
UNION ALL
    SELECT k1, k2,
        BITMAP_BUCKET_NUMBER(e2) as bitmap_bkt_no,
        BITMAP_CONSTRUCT_AGG(BITMAP_BIT_POSITION(e2)) as bitmap_bkt,
        2 as bm_marker,
        0 as sum_e3,
        MAX(e4) as max_e4
    FROM tab
    GROUP BY k1, k2, BITMAP_BUCKET_NUMBER(e2);
``` where the mv_concat materialized view has a bm_marker column that identifies specific bit positions that count towards either expression e1 or expression e2.

Referring again to the example queries, provided below:

```
SELECT k1, COUNT(DISTINCT e1) as dcnt_e1, SUM(e3) as sum_e3
FROM tab
GROUP BY k1;
SELECT k1, k2, COUNT(DISTINCT e2) as dcnt_e2, MAX(e4) as max_e4,
FROM tab
GROUP BY k1, k2;
```

The example queries may be rewritten to query from the mv_concat materialized view, using the bm_marker column to select values associated with either e1 or e2. The example queries may be rewritten as:

```
SELECT k1, SUM(bitmap_cnt) as dcnt_e1, SUM(sum_e3) as sum_e3
FROM (
    SELECT k1, bitmap_bkt_no,
        BITMAP_COUNT(BITMAP_OR_AGG(CASE WHEN bm_marker = 1 THEN bitmap_bkt
END)) as bitmap_cnt,
        SUM(sum_e3) as sum_e3
    FROM mv_concat
    GROUP BY k1, bitmap_bkt_no
    )
GROUP BY k1;
SELECT k1, k2, SUM(bitmap_cnt) as dcnt_e2, MAX(max_e4) as max_e4
FROM (
    SELECT k1, k2, bitmap_bkt_no,
        BITMAP_COUNT(BITMAP_OR_AGG(CASE WHEN bm_marker = 2 THEN bitmap_bkt
END)) as bitmap_cnt,
        MAX(max_e4) as max_e4
    FROM mv_concat
    GROUP BY k1, k2, bitmap_bkt_no
    )
GROUP BY k1, k2;
```

In yet another embodiment, count distinct values for expressions e1 and e2 may be calculated using a single materialized view, where the bitmap buckets for each count distinct expression are stored as a Cartesian row in the single materialized view. For instance, the single materialized view, referred to as mv_cartesian, may be created using the following code:

```
CREATE MATERIALIZED VIEW mv_cartesian AS
SELECT k1, k2,
    BITMAP_BUCKET_NUMBER(e1) as bitmap_1_bkt_no,
    BITMAP_CONSTRUCT_AGG(BITMAP_BIT_POSITION(e1)) as bitmap_1_bkt,
    BITMAP_BUCKET_NUMBER(e2) as bitmap_2_bkt_no,
    BITMAP_CONSTRUCT_AGG(BITMAP_BIT_POSITION(e2)) as bitmap_2_bkt,
    SUM(e3) as sum_e3,
    MAX(e4) as max_e4
FROM tab
GROUP BY k1, k2, BITMAP_BUCKET_NUMBER(e1), BITMAP_BUCKET_NUMBER(e2);
```

The example queries may be rewritten using the mv_cartesian materialized view, as:

```
SELECT k1, SUM(bitmap_1_cnt) as dcnt_e1, SUM(sum_e3) as sum_e3
FROM (
    SELECT k1, bitmap_1_bkt_no,
        BITMAP_COUNT(BITMAP_OR_AGG(bitmap_1_bkt)) as bitmap_1_cnt,
        SUM(sum_e3) as sum_e3
    FROM mv_cartesian
    GROUP BY k1, bitmap_1_bkt_no
    )
```

```
GROUP BY k1;
SELECT k1, k2, SUM(bitmap_2_cnt) as dcnt_e2, MAX(max_e4) as max_e4
FROM (
    SELECT k1, k2, bitmap_2_bkt_no,
        BITMAP_COUNT(BITMAP_OR_AGG(bitmap_2_bkt)) as bitmap_2_cnt,
        MAX(max_e4) as max_e4
    FROM mv_cartesian
    GROUP BY k1, k2, bitmap_2_bkt_no
    )
GROUP BY k1, k2;
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
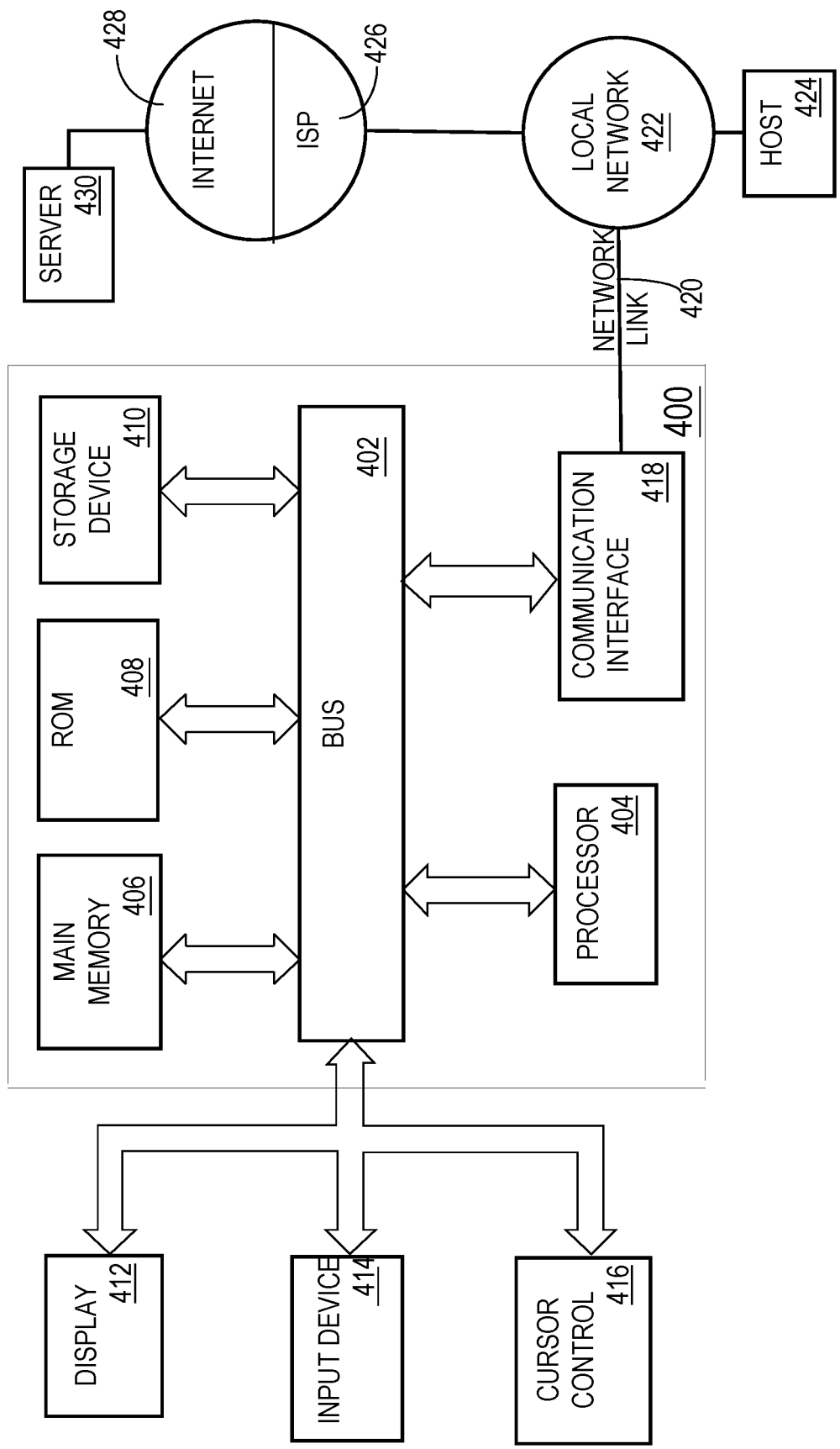
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for satisfying queries, which require a count distinct operation, using materialized view data, comprising:
    storing, in a materialized view:
        bitmap data that represents a bitmap,
        wherein the bitmap corresponds to a particular expression,
        wherein the particular expression has a set of possible distinct values,
        wherein each bit in the bitmap represents a respective value of the set of possible distinct values,
        wherein the bitmap data comprises a plurality of sets of bits representing at least a particular portion of the bitmap, and
        wherein each set of bits, of the plurality of sets of bits:
            corresponds to a corresponding grouping key value, of a particular grouping key, that exists in a particular set of data,
            comprises bits, set to a first value, that correspond to values, of the set of possible distinct values of the particular expression, that exist in the particular set of data in association with the corresponding grouping key value,
            wherein bits, in said each set of bits, that correspond to values, of the set of possible distinct values of the particular expression, that do not exist, in association with the corresponding grouping key value, in the particular set of data are set to a second value that is different than the first value,
    receiving a query with a particular count distinct operation that requests a number of distinct values, of the particular expression, in the particular set of data;
    in response to receiving the query, a database server rewriting the query to produce a rewritten query that is configured to compute the number of distinct values based, at least in part, on the bitmap data of the materialized view; and
    the database server executing the rewritten query to compute the requested number of distinct values based, at least in part, on the bitmap data of the materialized view by:
        aggregating at least two sets of bits, of the plurality of sets of bits, to produce an aggregate set of bits, and
        counting bits in the aggregate set of bits that are set to the first value.

2. The method of claim 1, wherein:
    the bitmap data comprises a plurality of bitmap buckets; and
    each bitmap bucket, of the plurality of bitmap buckets, corresponds to a respective range of values of a plurality of ranges of values within the set of possible distinct values of the particular expression.

3. The method of claim 2, wherein:
    one or more instantiated bitmap buckets, of the plurality of bitmap buckets, are instantiated in memory; and
    storing the bitmap data in the materialized view comprises, for each value of the set of possible distinct values of the particular expression that exists in the particular set of data:
        identifying a corresponding bit of the bitmap that represents said each value;
        determining whether the corresponding bit of the bitmap overlaps with a range of an instantiated bitmap bucket of the one or more instantiated bitmap buckets;
        in response to determining that the corresponding bit of the bitmap does not overlap with any instantiated bitmap bucket of the one or more instantiated bitmap buckets:
            instantiating a particular bitmap bucket that has a range that overlaps with the corresponding bit, and
            setting a bit, in the particular bitmap bucket that represents the corresponding bit of the bitmap, to the first value.

4. The method of claim 3, wherein:
    the bitmap comprises a particular bit that represents a particular value, of the set of possible distinct values of the first particular expression, that exists in the particular set of data; and the method further comprises:
- determining that the particular bit of the bitmap overlaps with a range of a particular instantiated bitmap bucket of the one or more instantiated bitmap buckets, and
- responsive to determining that the particular bit overlaps with the range of the particular instantiated bitmap bucket, setting an instantiated bit, which represents the particular bit of the bitmap in the particular instantiated bitmap bucket, to the first value.

5. The method of claim 2, wherein:
the bitmap data in the materialized view includes a second bitmap that corresponds to a second expression that has a second set of possible distinct values;
each bit of the second bitmap represents a respective value of the second set of possible distinct values; and
the materialized view further comprises:
- a set of instantiated bitmap buckets of the plurality of bitmap buckets;
- first one or more bitmap expression markers, having a first marker value, that indicate that corresponding first one or more instantiated bitmap buckets, of the set of instantiated bitmap buckets, represent values of the particular expression, and
- second one or more bitmap expression markers, having a second marker value, that indicate that corresponding second one or more instantiated bitmap buckets, of the plurality of bitmap buckets, represent values of the second expression;

the rewritten query is further configured to compute the number of distinct values of the particular expression by identifying the first one or more instantiated bitmap buckets, of the set of instantiated bitmap buckets in the materialized view, based on the first one or more instantiated bitmap buckets being associated with bitmap expression markers having the first marker value.

6. The method of claim 1, further comprising:
storing, in a second materialized view, second bitmap data that represents a second bitmap;
wherein the second bitmap corresponds to a second expression;
wherein the second expression has a second set of possible distinct values;
wherein each bit in the second bitmap represents a respective value of the second set of possible distinct values;
wherein bits of the second bitmap data that correspond to values, of the second set of possible distinct values of the second expression, that exist in the particular set of data are set to the first value; and
wherein bits of the second bitmap data that correspond to values, of the second set of possible distinct values of the second expression, that do not exist in the particular set of data are set to the second value.

7. The method of claim 6, wherein:
the query further requests a number of distinct values of the second expression in the particular set of data; and
the rewritten query is further configured to compute the number of distinct values of the second expression by counting bits in the second bitmap data that are set to the first value.

8. The method of claim 1, further comprising:
receiving a second query that requests a plurality of numbers of distinct values, of the particular expression in the particular set of data, that are grouped by the particular grouping key;
wherein a first set of bits, of the plurality of sets of bits, corresponds to a first grouping key value of the particular grouping key;
wherein a second set of bits, of the plurality of sets of bits, corresponds to a second grouping key value of the particular grouping key;
in response to receiving the second query, the database server rewriting the second query to produce a second rewritten query that is configured to:
- count bits in the first set of bits that are set to the first value to produce a first number of distinct values associated with the first grouping key value, and
- count bits in the second set of bits that are set to the first value to produce a second number of distinct values associated with the second grouping key value; and the database server executing the second rewritten query.

9. The method of claim 1, further comprising:
storing, in the materialized view, second bitmap data that represents a second bitmap in which each bit represents each value of a second set of possible distinct values of a second expression; and
wherein bits of the second bitmap data that correspond to values, of the second set of possible distinct values of the second expression, that exist in the particular set of data are set to the first value, and bits of the second bitmap data that correspond to values, of the second set of possible distinct values of the second expression, that do not exist in the particular set of data are set to the second value.

10. The method of claim 1, further comprising:
determining that one or more values, of the particular set of data, have changed; and
based, at least in part, on said determining that the one or more values have changed, updating the bitmap data in the materialized view such that:
- bits that correspond to values, of the set of possible distinct values of the particular expression, that exist in the particular set of data are set to the first value, and
- bits that correspond to values, of the set of possible distinct values of the particular expression, that do not exist in the particular set of data are set to the second value.

11. The method of claim 1, further comprising calculating the bitmap data by:
partitioning the particular set of data into a plurality of sets of partitioned data;
assigning one or more threads, of a set of threads, to each set of partitioned data of the plurality of sets of partitioned data;
for each set of partitioned data of the plurality of sets of partitioned data, the one or more threads that are assigned to said each set of partitioned data calculating a partition-specific portion of the bitmap data based on said each set of partitioned data; and
merging the partition-specific portions of the bitmap data to produce the bitmap data.

12. The method of claim 1, further comprising:
storing, in the materialized view, one or more aggregate values;
wherein each aggregate value of the one or more aggregate values is calculated based on applying an additional expression, of one or more additional expressions other than the particular expression, to the particular set of data;

wherein the query further requests an aggregate value for a particular additional expression of the one or more additional expressions; and wherein the rewritten query is further configured to obtain the aggregate value for the particular additional expression based on the one or more aggregate values in the materialized view.

13. The method of claim 12, wherein the one or more additional expressions include at least one of a non-distinct count operation, a sum operation, an average operation, a minimum operation, or a maximum operation.

14. The method of claim 1, wherein the set of possible distinct values of the particular expression represent discrete numerical values.

15. One or more non-transitory computer-readable media storing instructions that, when executed by one or more computing devices, cause:
storing, in a materialized view:
bitmap data that represents a bitmap,
wherein the bitmap corresponds to a particular expression,
wherein the particular expression has a set of possible distinct values,
wherein each bit in the bitmap represents a respective value of the set of possible distinct values,
wherein the bitmap data comprises a plurality of sets of bits representing at least a particular portion of the bitmap, and
wherein each set of bits, of the plurality of sets of bits:
corresponds to a corresponding grouping key value, of a particular grouping key, that exists in a particular set of data,
comprises bits, set to a first value, that correspond to values, of the set of possible distinct values of the particular expression, that exist in the particular set of data in association with the corresponding grouping key value,
wherein bits, in said each set of bits, that correspond to values, of the set of possible distinct values of the particular expression, that do not exist, in association with the corresponding grouping key value, in the particular set of data are set to a second value that is different than the first value,
receiving a query with a particular count distinct operation that requests a number of distinct values, of the particular expression, in the particular set of data;
in response to receiving the query, a database server rewriting the query to produce a rewritten query that is configured to compute the number of distinct values based, at least in part, on the bitmap data of the materialized view; and
the database server executing the rewritten query to compute the requested number of distinct values based, at least in part, on the bitmap data of the materialized view by:
aggregating at least two sets of bits, of the plurality of sets of bits, to produce an aggregate set of bits, and
counting bits in the aggregate set of bits that are set to the first value.

16. The one or more non-transitory computer-readable media of claim 15, wherein:
the bitmap data comprises a plurality of bitmap buckets; and
each bitmap bucket, of the plurality of bitmap buckets, corresponds to a respective range of values of a plurality of ranges of values within the set of possible distinct values of the particular expression.

17. The one or more non-transitory computer-readable media of claim 16, wherein:
one or more instantiated bitmap buckets, of the plurality of bitmap buckets, are instantiated in memory; and
storing the bitmap data in the materialized view comprises, for each value of the set of possible distinct values of the particular expression that exists in the particular set of data:
identifying a corresponding bit of the bitmap that represents said each value;
determining whether the corresponding bit of the bitmap overlaps with a range of an instantiated bitmap bucket of the one or more instantiated bitmap buckets;
in response to determining that the corresponding bit of the bitmap does not overlap with any instantiated bitmap bucket of the one or more instantiated bitmap buckets:
instantiating a particular bitmap bucket that has a range that overlaps with the corresponding bit, and
setting a bit, in the particular bitmap bucket that represents the corresponding bit of the bitmap, to the first value.

18. The one or more non-transitory computer-readable media of claim 17, wherein:
the bitmap comprises a particular bit that represents a particular value, of the set of possible distinct values of the particular expression, that exists in the particular set of data; and
the instructions further comprise instructions that, when executed by one or more computing devices, cause:
determining that the particular bit of the bitmap overlaps with a range of a particular instantiated bitmap bucket of the one or more instantiated bitmap buckets, and
responsive to determining that the particular bit overlaps with the range of the particular instantiated bitmap bucket, setting an instantiated bit, which represents the particular bit of the bitmap in the particular instantiated bitmap bucket, to the first value.

19. The one or more non-transitory computer-readable media of claim 16, wherein:
the bitmap data in the materialized view includes a second bitmap that corresponds to a second expression that has a second set of possible distinct values;
each bit of the second bitmap represents a respective value of the second set of possible distinct values; and
the materialized view further comprises:
a set of instantiated bitmap buckets of the plurality of bitmap buckets;
first one or more bitmap expression markers, having a first marker value, that indicate that corresponding first one or more instantiated bitmap buckets, of the set of instantiated bitmap buckets, represent values of the particular expression, and
second one or more bitmap expression markers, having a second marker value, that indicate that corresponding second one or more instantiated bitmap buckets, of the plurality of bitmap buckets, represent values of the second expression;
the rewritten query is further configured to compute the number of distinct values of the particular expression by identifying the first one or more instantiated bitmap buckets, of the set of instantiated bitmap buckets in the materialized view, based on the first one or more instantiated bitmap buckets being associated with bitmap expression markers having the first marker value.

20. The one or more non-transitory computer-readable media of claim 15, wherein the instructions further comprise instructions that, when executed by one or more computing devices, cause:
storing, in a second materialized view, second bitmap data that represents a second bitmap;
wherein the second bitmap corresponds to a second expression;
wherein the second expression has a second set of possible distinct values;
wherein each bit in the second bitmap represents a respective value of the second set of possible distinct values;
wherein bits of the second bitmap data that correspond to values, of the second set of possible distinct values of the second expression, that exist in the particular set of data are set to the first value; and
wherein bits of the second bitmap data that correspond to values, of the second set of possible distinct values of the second expression, that do not exist in the particular set of data are set to the second value.

21. The one or more non-transitory computer-readable media of claim 20, wherein:
the query further requests a number of distinct values of the second expression in the particular set of data; and
the rewritten query is further configured to compute the number of distinct values of the second expression by counting bits in the second bitmap data that are set to the first value.

22. The one or more non-transitory computer-readable media of claim 15, wherein the instructions further comprise instructions that, when executed by one or more computing devices, cause:
receiving a second query that requests a plurality of numbers of distinct values, of the particular expression in the particular set of data, that are grouped by the particular grouping key;
wherein a first set of bits, of the plurality of sets of bits, corresponds to a first grouping key value of the particular grouping key;
wherein a second set of bits, of the plurality of sets of bits, corresponds to a second grouping key value of the particular grouping key;
in response to receiving the second query, the database server rewriting the second query to produce a second rewritten query that is configured to:
count bits in the first set of bits that are set to the first value to produce a first number of distinct values associated with the first grouping key value, and
count bits in the second set of bits that are set to the first value to produce a second number of distinct values associated with the second grouping key value; and
the database server executing the second rewritten query.

23. The one or more non-transitory computer-readable media of claim 15, wherein the instructions further comprise instructions that, when executed by one or more computing devices, cause
storing, in the materialized view, second bitmap data that represents a second bitmap in which each bit represents each value of a second set of possible distinct values of a second expression; and
wherein bits of the second bitmap data that correspond to values, of the second set of possible distinct values of the second expression, that exist in the particular set of data are set to the first value, and bits of the second bitmap data that correspond to values, of the second set of possible distinct values of the second expression, that do not exist in the particular set of data are set to the second value.

24. The one or more non-transitory computer-readable media of claim 15, wherein the instructions further comprise instructions that, when executed by one or more computing devices, cause:
determining that one or more values, of the particular set of data, have changed; and
based, at least in part, on said determining that the one or more values have changed, updating the bitmap data in the materialized view such that:
bits that correspond to values, of the set of possible distinct values of the particular expression, that exist in the particular set of data are set to the first value, and
bits that correspond to values, of the set of possible distinct values of the particular expression, that do not exist in the particular set of data are set to the second value.

25. The one or more non-transitory computer-readable media of claim 15, wherein the instructions further comprise instructions that, when executed by one or more computing devices, cause calculating the bitmap data by:
partitioning the particular set of data into a plurality of sets of partitioned data;
assigning one or more threads, of a set of threads, to each set of partitioned data of the plurality of sets of partitioned data;
for each set of partitioned data of the plurality of sets of partitioned data, the one or more threads that are assigned to said each set of partitioned data calculating a partition-specific portion of the bitmap data based on said each set of partitioned data; and
merging the partition-specific portions of the bitmap data to produce the bitmap data.

26. The one or more non-transitory computer-readable media of claim 15, wherein the instructions further comprise instructions that, when executed by one or more computing devices, cause:
storing, in the materialized view, one or more aggregate values;
wherein each aggregate value of the one or more aggregate values is calculated based on applying an additional expression, of one or more additional expressions other than the particular expression, to the particular set of data;
wherein the query further requests an aggregate value for a particular additional expression of the one or more additional expressions; and
wherein the rewritten query is further configured to obtain the aggregate value for the particular additional expression based on the one or more aggregate values in the materialized view.

27. The one or more non-transitory computer-readable media of claim 26, wherein the one or more additional expressions include at least one of a non-distinct count operation, a sum operation, an average operation, a minimum operation, or a maximum operation.

28. The one or more non-transitory computer-readable media of claim 15, wherein the set of possible distinct values of the particular expression represent discrete numerical values.

* * * * *

UNITED STATES PATENT AND TRADEMARK OFFICE
CERTIFICATE OF CORRECTION

PATENT NO. : 11,379,476 B2
APPLICATION NO. : 16/653639
DATED : July 5, 2022
INVENTOR(S) : Petride et al.

It is certified that error appears in the above-identified patent and that said Letters Patent is hereby corrected as shown below:

On the Title Page

On page 2, Column 1, under Other Publications, Line 12, delete "Databse" and insert -- Database --, therefor.

On page 2, Column 2, under Other Publications, Line 17, delete "Tshinghua" and insert -- Tsinghua --, therefor.

In the Drawings

On sheet 3 of 4, in FIG. 3, under Reference Numeral 315, Line 2, delete "Sat" and insert -- Set --, therefor.

In the Specification

In Columns 9-10, Lines 5-6, delete "(expression ," and insert -- (expression, --, therefor.

In the Claims

In Column 30, Line 66, in Claim 4, delete "the first" and insert -- the --, therefor.

Signed and Sealed this
Tenth Day of January, 2023

Katherine Kelly Vidal
*Director of the United States Patent and Trademark Office*